June 13, 1967 F. GASCHE ET AL 3,325,036
PRESSURE VESSEL AND SCREW CONNECTION THEREFOR
Filed May 13, 1965 2 Sheets-Sheet 1

INVENTORS.
Fred Gasche
Darrell D. Frederick
BY
THEIR ATTORNEYS

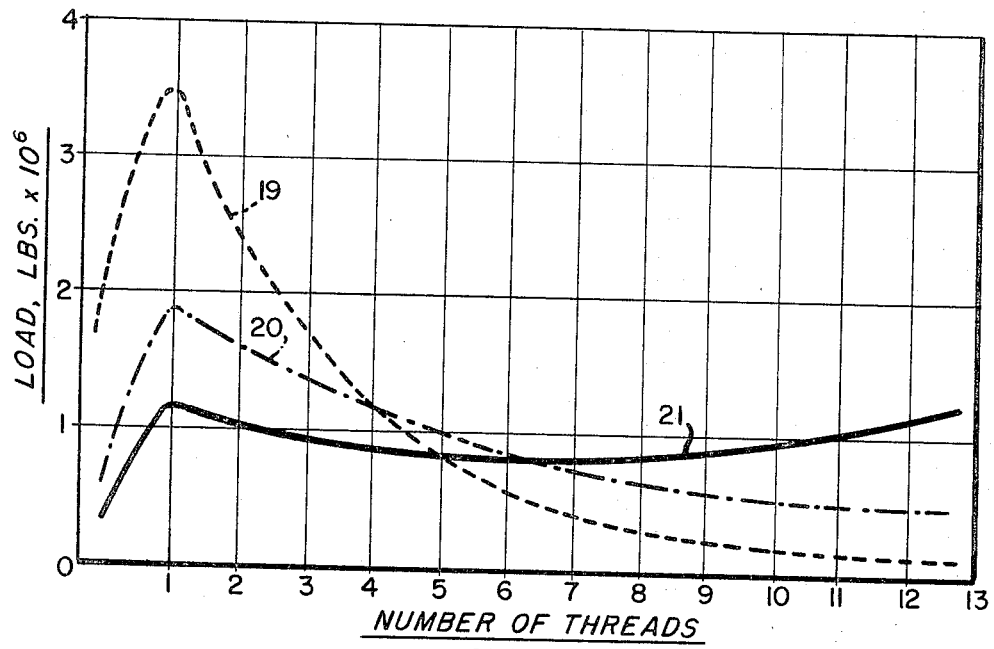
Fig. 3
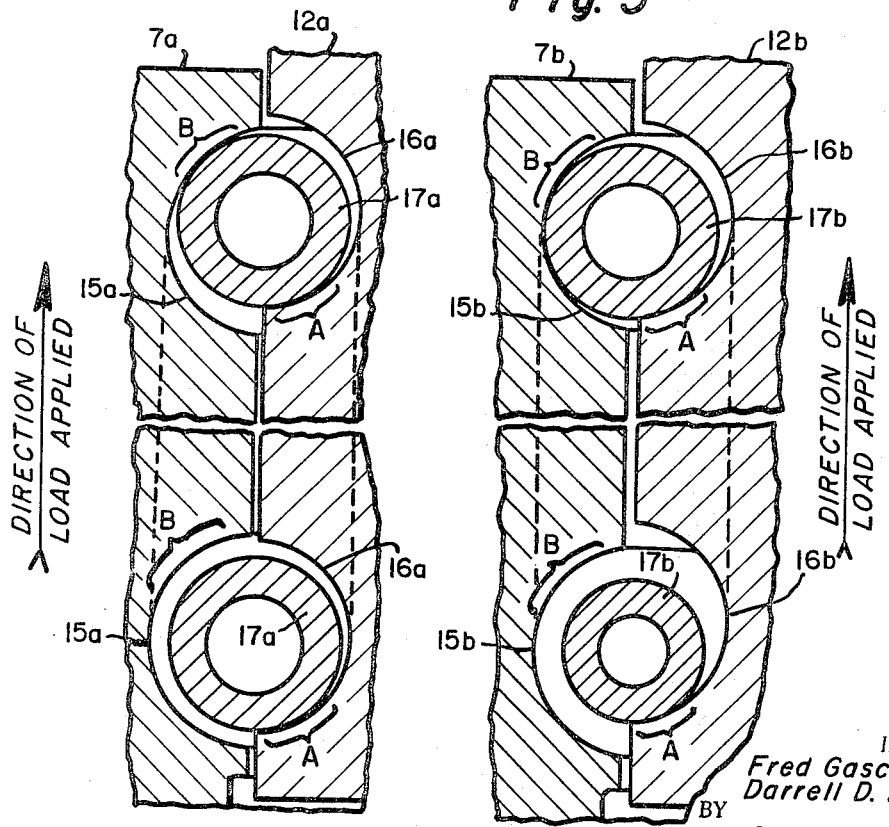
Fig. 4
Fig. 5
INVENTORS.
Fred Gasche
Darrell D. Frederick
BY Webb Burden Robinson & Wolfe
THEIR ATTORNEYS 3,325,036
PRESSURE VESSEL AND SCREW CONNECTION
THEREFOR
Fred Gasche and Darrell D. Frederick, Erie, Pa., assignors to Autoclave Engineers, Inc., Erie, Pa., a corporation of Pennsylvania
Filed May 13, 1965, Ser. No. 455,399
20 Claims. (Cl. 220—3)

This application relates to a pressure vessel and screw connection therefor, more particularly a pressure vessel having an access opening, a cover for the opening, and a screw connection for securing the cover over the opening. Such vessels, particularly those used in experimental work, are subjected to extreme and cycling variations in temperature and pressure. Conventionally, the covers for such vessels have been held by a nut having an external diameter matching the inner diameter of the portion of the vessel adjacent the cover and threaded into this portion of the vessel to hold the cover in place. These threaded connections have been conventional screw threaded connections in which, as is well known, extreme stresses are set up on the first thread, because that thread carries a substantial portion of the entire load to which the thread is subjected. Because of extreme and cycling variations in temperature and pressure, and because of the stress concentration on the first thread, conventional pressure vessels cannot be subjected to temperatures and pressures as high as desired in present experimental work.

In U.S. Pat. No. 3,104,583 there is shown a pressure vessel having a screw connection whereby a cover may be held on an opening of the vessel which will withstand severe and cycling conditions of temperature and pressure. In the vessel shown in this patent, there is a helical passageway between the vessel and a nut for holding a cover on an access opening of the vessel and a resilient tubular member in the form of a coiled helical spring extending through this passageway which acts as threads for threading the nut into the pressure vessel. The helical spring is resilient and, therefore, when a load is imposed by pressure within the vessel, the coils of the helical spring forming the first or inner thread are compressed, and thereby transmit a portion of the load to succeeding threads of the connection in the direction in which the load is applied.

This application is directed to an improvement which we have made in a screw connection such as shown in U.S. Pat. No. 3,104,583, whereby the load imposed on the threads of a screw connection is more evenly distributed among the several threads than is done by the screw connection shown in the patent.

The pressure vessel and threaded connection therefor which we have invented is generally similar to that shown in the patent. However, the acting parts, i.e., the nut, the portions of the vessel opposed to the nut, the helical grooves in the opposed surfaces of the nut and of the pressure vessel, and the resilient tubular member are so dimensioned that the clearance space between the outer peripheries of the individual coils of the helical spring and the surfaces of the grooves increases in amount from the thread which is furthest from the point of application of the load to the first thread, which is closest to the point of load application.

The gradually increasing clearance space can be provided in a number of ways. Thus, the grooves in the opposed surfaces may be of uniform depth and the outer surface of the nut may be tapered, thus, in effect, decreasing the pitch diameter of the grooves, or the inner surface of the vessel opposed to the nut can be tapered inwardly, thus, in effect, increasing the pitch diameter of the grooves in this inner surface. Also, both of the opposed surfaces of the nut and of the vessel could be tapered.

An increasing clearance space between the outer periphery of the spring and of the opposed surfaces of the grooves can also be produced by maintaining the opposed surfaces of the nut and of the vessel cylindrical and gradually increasing the depth of the grooves from a point farthest away from the application of the load to the point nearest to the point of load application.

Also, the diameters of the individual coils of a helical spring can be varied over the length of the spring, and the spring is then positioned in the helical passage formed by the helical grooves in the nut and in the opposed surface of the vessel, so that the end of the helical coil having individual coils of smallest diameter is near the end of the helical passageway which is nearest the point of application of load on the threaded connection.

In the accompanying drawings we have illustrated certain presently preferred embodiments of our invention in which:

FIGURE 3 is a graph comparing the distribution of an applied load on threads of a conventional thread connection, threads of a connection such as that shown in U.S. Patent No. 3,104,583, and threads of a connection made in accordance with this invention;

FIGURE 4 is a portion of a longitudinal section similar to that of FIGURE 2, but showing a modification of our invention; and FIGURE 5 is a portion of a longitudinal section similar to that of FIGURE 2, but showing a further modification of our invention.

Figure 1:
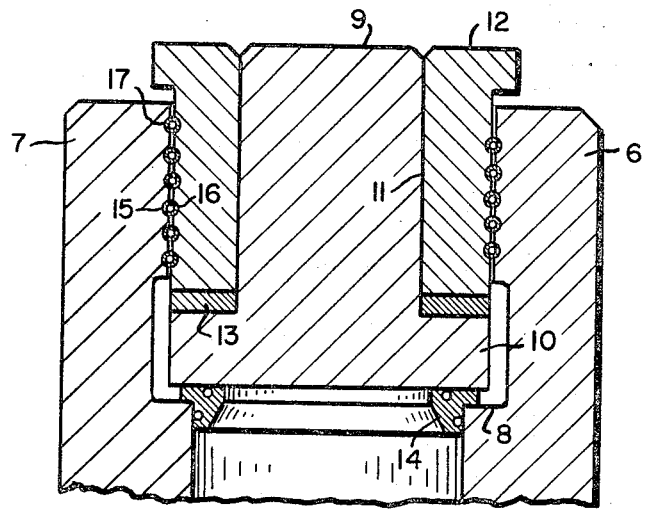
FIGURE 1 is a longitudinal section of a portion of a pressure vessel having an opening, a cover for the opening, and a screw connection for holding the cover on the opening.

Referring to FIGURE 1, a pressure vessel made in accordance with our invention comprises a body 6 in the form of a hollow cylinder usually open at both ends which are each closed by covers such as shown in FIGURE 1. Adjacent each end there is an end portion 7 of increased internal diameter forming a seat 8 for a cover 9. The cover 9 is also cylindrical and has an inner portion 10 of a diameter sufficient to rest on the seat 8 and an outer portion 11 of reduced diameter which forms with the end portion 7 of the body an annular space for a nut 12.

As will later be described, the nut 12 is threaded into the end 7 of the vessel body, and when threaded into the body, presses on a thrust washer 13 seated on the enlarged portion 10 of the cover, and presses the cover towards the seat 8. A conventional O ring seal 14 seals the joint between the seat 8 and the cover 9.

The opposed surfaces of the nut 12 and the end 7 of the vessel are grooved, the grooves being in the form of helices which extend axially along the opposed surfaces of these two members. The grooves 15 and 16 are opposed, positioned opposite to each other to form a helical passage which extends axially from the open end of the pressure vessel to a point adjacent the thrust washer 13. A coiled helical spring 17, having individual contiguous coils of a diameter slightly less than the cross-section of the helical passage, extends the length of the helical passage and thereby forms threads whereby the two telescoping members, the end 7 of the pressure vessel and the nut 12, may be threadably connected to each other.

The spring 17 may be mounted in the groove 15 or the groove 16 and may be held in either groove in the manner described in U.S. Pat. No. 3,104,583.

Figure 2:
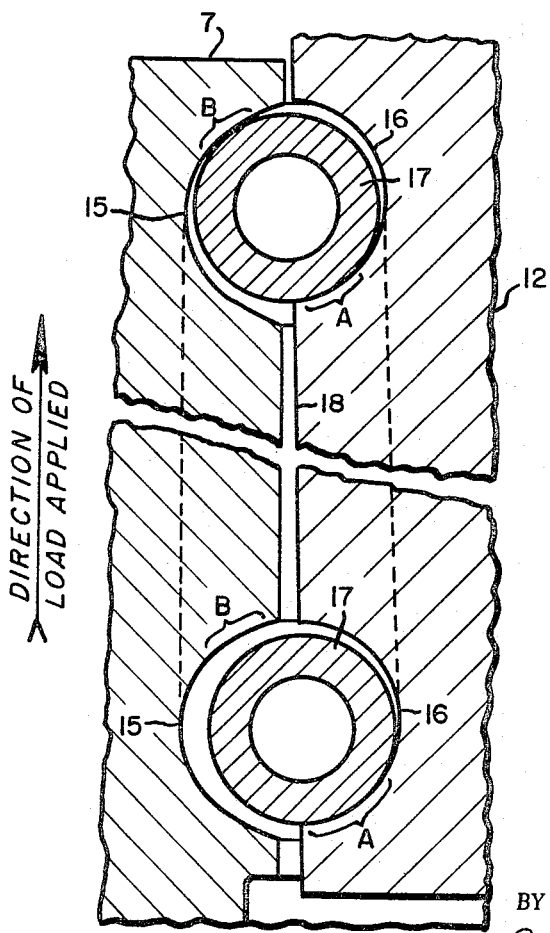
FIGURE 2 is a portion of a longitudinal section such as that shown in FIGURE 1 but on a larger scale.

FIGURE 2 is a part of a longitudinal section similar to FIGURE 1 but on an enlarged scale and shows the threaded connection between the upper portion 7 of the pressure vessel and the nut 12. In this figure, only the first or inner thread and the last or outer thread are shown, the intermediate threads being indicated by dash lines.

The outer surface 18 of the nut 12 is tapered inwardly, that is, the end of the nut nearest the thrust washer 13 is smaller in diameter than the opposite end of the nut. The depth of the groove 16 in the nut 12 is uniform throughout, and the groove 15 is uniform in depth throughout its length in the end 7, but it is larger than the groove 16, so as to provide a working clearance whereby the nut can be threaded with relative ease in and out of the end 7 of the pressure vessel.

FIGURE 2 shows the relative positions of the parts when no load has been applied to the threaded connection. An arrow shows the direction of the applied load, which is the force of the pressure within the pressure vessel tending to lift the cover 9 from the seat 8, the force acting against the nut 12 through the thrust washer 13. When a load is applied, the nut 12 reacts against the individual coils of the helical spring 17 along the areas marked A in FIGURE 2, and the individual coils forming the threads react against the grooves 15 in the end 7 of the vessel along the areas marked B in FIGURE 2. However, because the outer surface of the nut 12 is tapered, there is a substantial clearance between the outer periphery of the individual coils of the spring 17 forming the first or inner thread and the opposed area B in the end portion 7. The threads inbetween the first and last threads have similar clearances which decrease in the width as the threads progress from the first to the last thread.

When a load is applied on the nut 12 in the direction indicated by the arrow, the nut moves in the direction of the arrow compressing the coils of the spring initially at the last or outer thread and successively the balance of the coils as clearance between them and the opposed grooves in the end portion 7 of the vessel is successively taken up. Finally, the coils forming the first or inner thread are compressed.

The effect of this sequential compression of the individual coils forming the series of threads in the threaded connection between the nut and the body of the pressure vessel is to distribute the imposed load over all of the threads making the connection. This is shown in FIGURE 3 which is a graph in which the distribution of the load on the threads in a connection embodying our invention is compared with the distribution on the threads of a conventional threaded connection and on threads of a connection such as that shown in U.S. Pat. No. 3,104,583.

The figures appearing in the graph have been calculated from the design of a pressure vessel having an internal diameter of 18 inches and intended to withstand a pressure of 45,000 pounds to the square inch. In this design, the maximum thread length is 14⅝ inches; the pitch of the threads is 1.125 inches; and the pitch diameter of the threads at the last or outer thread is 24 inches. The taper on the nut is adjusted from top to bottom such that the resultant clearance between the tubular member or spring 17 and the bearing, area B, FIGURE 2, increases .002″ per thread or spring coil starting from the outermost thread and proceeding towards the innermost thread nearest the seal. In other words, the outermost thread has zero clearance, the next thread down has .002″, the next .004″, etc. The bottom thread has a clearance of .026″.

In FIGURE 3 the dash line 19 shows the distribution of the load calculated for a conventional Acme thread. The dash and dot line 20 shows the distribution of the load on threads in a threaded connection such as that shown in U.S. Pat. No. 3,104,583 and the solid line 21 shows the distribution of the load on threads in a threaded connection embodying this present invention. It will be noted from FIGURE 3 that the load imposed on the first thread of a conventional Acme threaded connection is $3.5 \times 10^6$ pounds. The load on the first thread of a threaded connection of the type shown in Patent No. 3,104,583 is $1.85 \times 10^6$ pounds, and the load on the first thread of a threaded connection embodying this invention is $1.2 \times 10^6$ pounds. Moreover, as appears from the shape of the line 21 in FIGURE 3, the load on the last or outer thread is approximately the same as the load on the first thread, and the distribution of the load through all the thread closely approximates uniformity.

Instead of inwardly tapering the nut 12 from the last or outer thread towards the first or inner thread, the opposed surface of the end portion 7 of the vessel could be tapered, so that the diameter of the inner surface of the portion adjacent the thrust washer 13 is greater than the diameter of this surface adjacent the outer or last thread.

FIGURE 4 shows a modified form of our thread connection in which there is a clearance between the outer peripheries of the individual coils of the helical spring and the opposed surfaces of the grooves in the nut and end portion of the vessel which increases progressively from the outer or last thread towards the first or inner thread. The parts shown in FIGURE 4 are generally the same as those shown in FIGURE 2 and bear the same reference numbers with the suffix "a." In the modification shown in FIGURE 4, the opposed surfaces of the end portion 7a of the vessel and of the nut 12a are cylindrical and of uniform diameter. Progressively increasing clearance space between the helical spring 17a and the opposed surfaces of the grooves 15a and 16a is obtained by progressively increasing the depth of the grooves 15a in the end portion 7a from the last or outer thread to the first or inner thread.

The action of the parts when a load is applied to the nut 12a is the same as that described with reference to the structure shown in FIGURE 2. Upon application of the load on the nut 12a, the load is first applied at the area B adjacent the last or outer thread and is progressively applied to succeeding threads in the direction of the first or inner thread until finally it is applied at the area B to the first or inner thread.

FIGURE 5 shows a further modification of our threaded connection in which the parts are generally the same as those in FIGURES 2 and 4 and bear the same reference numbers with the suffix b. In the modification shown in FIGURE 5, increasing clearance between the outer peripheries of the individual coils of the helical spring 17b and the opposed surfaces of the grooves 15b and 16b is obtained by making the outer diameter of the helical spring 17b increasingly smaller along the length of the spring, and by placing the spring in the helical path formed by the grooves 15b and 16b so that the end of the spring having the smaller diameter is in the end of the passageway forming the first thread and the end of greater diameter is in the part of the helical passageway forming the last or outer thread. The action of the parts shown in FIGURE 5 upon the application of a load is the same as that described with reference to the structure shown in FIGURE 2.

So far in this specification, the resilient tubular member 17 which forms the thread in the threaded connection between the nut and the body of the pressure vessel has been described as a single coiled helical spring. The spring need not be continuous, but can be made up of several springs having lengths which are convenient to handle. It will be understood, however, that the resilient tubular member may have other forms, for example, a continuous metal tube, or segments of tubes. It may comprise a series of short members which are C-shaped in cross-section and which are strung on a wire or rod which extends along the helical path formed by the grooves 15 and 16.

From the foregoing, it is apparent that we have invented a pressure vessel and a threaded connection therefor which has outstanding advantages over pressure vessels heretofore known. Our invention provides a pressure vessel and a threaded connection therefor which produces approximately uniform distribution of the load applied to a threaded connection for closing the vessel among all the threads forming the connection. Resistance to fatigue failure has been greatly increased by the approximately uniform distribution of the load in the threaded connection. Thereby design limitations imposed by conventional threaded connections have been substantially eliminated.

While we have described certain presently preferred embodiments of our invention, it is to be understood that it may be otherwise variously embodied within the scope of the appended claims.

We claim:

1. A pressure vessel comprising
    (A) a hollow body having
        (1) at least one opening for access from outside the body into the interior of said body,
        (2) a portion forming a passage leading to said opening, said passage having an interior surface, and
        (3) a portion of reduced cross-sectional area adjacent said opening to form a sealing seat for closing said opening,
    (B) a cover for closing said opening and having,
        (1) a portion having a cross-sectional area to cover said seat, and
        (2) a portion of reduced area extending from said cylindrical portion towards the outer end of said passage and spaced from the interior surface of said passage,
    (C) a nut extending into the space between said passage and the portion of the cover of reduced area,
    (D) a helical groove in the interior surface of said passage and extending axially along said passage,
    (E) a helical groove in the surface of the nut opposed to the interior surface of the passage and facing the groove in the interior surface of the passage, and
    (F) a resilient tubular member having a cross section sufficient to extend into said grooves and provide a clearance space between the outer peripheries of the individual coils of said member and the surfaces of said grooves,
    (G) the width of said clearance space decreasing progressively along the length of said member from a point nearest said seat toards the open end of said passage.

2. A pressure vessel as described in claim 1 in which the pitch diameter of the groove in said nut increases progressively from its end nearest said seat towards the open end of said passage.

3. A pressure vessel as described in claim 1 in which the pitch diameter of the groove in the interior surface of said passage decreases progressively from its end nearest said seat towards the open end of said passage.

4. A pressure reducing vessel as described in claim 1 in which the exterior surface of said nut tapers from a point of larger diameter adjacent the outer end of said passage to a point of smaller diameter adjacent said seat.

5. A pressure vessel as described in claim 1 in which the interior surface of said passage tapers from a point of smaller diameter adjacent the outer end of said passage to a point of larger diameter adjacent said seat.

6. A pressure vessel as described in claim 1 in which the exterior surface of said nut tapers from a point of larger diameter adjacent the outer end of said passage to a point of smaller diameter adjacent said seat and in which the depth of the groove in said nut is uniform.

7. A pressure vessel as described in claim 1 in which the interior surface of said passage tapers from a point of smaller diameter adjacent the outer end of said passage to a point of larger diameter adjacent said opening and in which the depth of the groove in the interior surface of the passage is uniform.

8. A pressure vessel as described in claim 1 in which the cross section of said tubular resilient member progressively increases from its end adjacent said seat towards the outer end of said passage.

9. A pressure vessel as described in claim 1 in which the resilient tubular member comprises at least one helical spring.

10. A pressure vessel as described in claim 1 in which the resilient tubular member comprises at least one length of hollow metal tube.

11. A pressure vessel as described in claim 1 in which the resilient tubular member comprises a plurality of C-shaped segments positioned side by side in said grooves.

12. A screw connection comprising,
    (A) inner and outer telescoping bodies having a common axis and an annular space between them,
    (B) a helical groove in the outer surface of the inner telescoping body and extending axially along said body,
    (C) a helical groove in the inner surface of the outer telescoping body and extending axially along said body,
    (D) said grooves being positioned opposite to each other to define a helical passage, and
    (E) a tubular resilient member in said helical passage having a cross section such as to extend into said grooves and provide a clearance space between the outer peripheries of the member and the surfaces of said grooves,
    (F) the width of said clearance space decreasing progressively along the length of said tubular resilient member in the direction of an applied load tending to move said telescoping bodies axially with respect to each other.

13. A screw connection as described in claim 12 in which the pitch diameter of the grooves in the outer surface of the inner telescoping body progressively increases in the direction of an applied load tending to move said telescoping bodies axially with respect to each other.

14. A screw connection as described in claim 12 in which the pitch diameter of the groove in the inner surface of the outer telescoping body progressively decreases in the direction of an applied load tending to move said telescoping bodies axially with respect to each other.

15. A screw connection as described in claim 12 in which the cross section of the tubular resilient member progressively increases in the direction of an applied load tending to move said telescoping bodies axially with resect to each other.

16. A screw connection as described in claim 12 in which the outer surface of the inner telescoping body tapers to increase in diameter in the direction of an applied load tending to move said telescoping bodies axially with respect to each other.

17. A screw connection as described in claim 12 in which the inner surface of the outer telescoping body tapers to decrease in diameter in the direction of an applied load tending to move said telescoping bodies axially with respect to each other.

18. A screw connection as described in claim 12 in which the resilient tubular member comprises at least one helical spring.

19. A screw connection as described in claim 12 in which the resilient tubular member comprises at least one length of hollow metal tube.

20. A screw connection as described in claim 12 in which the resilient tubular member comprises a plurality of C-shaped segments positioned side by side in said grooves.

References Cited

UNITED STATES PATENTS

| 2,341,670 | 2/1944 | Stinbon | 85—46 |
| 2,418,418 | 4/1947 | Martin et al. | |
| 3,062,568 | 11/1962 | Andersen | 85—46 |
| 3,104,583 | 9/1963 | Gasche | 85—46 |

THERON E. CONDON, *Primary Examiner.*

G. E. LOWRANCE, *Assistant Examiner.*